United States Patent
Takacs et al.

(10) Patent No.: US 10,255,433 B2
(45) Date of Patent: *Apr. 9, 2019

(54) EXECUTING PROCESS CODE INTEGRITY VERIFICATON

(71) Applicant: Blackberry Limited, Waterloo (CA)

(72) Inventors: Kristof Takacs, Waterloo (CA); Jameson Bauer Hyde, Cambridge (CA); Marek Paruzel, Kitchener (CA); Ravi Singh, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 360 days.

This patent is subject to a terminal disclaimer.

(21) Appl. No.: 14/934,857

(22) Filed: Nov. 6, 2015

(65) Prior Publication Data

US 2017/0116413 A1    Apr. 27, 2017

Related U.S. Application Data

(60) Provisional application No. 62/247,131, filed on Oct. 27, 2015.

(51) Int. Cl.
*G06F 21/55* (2013.01)
*G06F 21/12* (2013.01)
*G06F 21/62* (2013.01)
*G06F 21/52* (2013.01)
*G06F 21/57* (2013.01)

(52) U.S. Cl.
CPC ............ *G06F 21/552* (2013.01); *G06F 21/12* (2013.01); *G06F 21/52* (2013.01); *G06F 21/554* (2013.01); *G06F 21/57* (2013.01); *G06F 21/6218* (2013.01)

(58) Field of Classification Search
CPC ........ G06F 21/552; G06F 21/57; G06F 21/52; G06F 21/554; G06F 21/12;
(Continued)

(56) References Cited

U.S. PATENT DOCUMENTS 8,127,316 B1    2/2012   Binotto et al.
2005/0132122 A1   6/2005   Rozas
(Continued)

FOREIGN PATENT DOCUMENTS

EP    1550988         11/2005
EP    2672382 A2      12/2013
EP    2897051 A2       7/2015

OTHER PUBLICATIONS

Partial European Search Report dated Apr. 3, 2017, received for European Application No. 16152003.6.
(Continued)

*Primary Examiner* — Kevin Bechtel
*Assistant Examiner* — Quazi Farooqui
(74) *Attorney, Agent, or Firm* — Jeffrey N. Giunta; Fleit Gibbons Gutman Bongini & Bianco P.L.

(57) ABSTRACT

A system and method to monitor executing processes are disclosed. A respective starting fingerprint of memory of each executing process within at least one process is determined during a system startup phase that is prior to a device operational phase. A present fingerprint of memory of the selected executing process within the at least one process is determined during the device operational phase and while a selected executing process is executing. A difference between the respective starting fingerprint of the selected executing process and the present fingerprint of the selected executing process is determined and an indication of the difference for the selected executing process is reported based on determining the difference.

20 Claims, 5 Drawing Sheets

(58) Field of Classification Search
CPC ...... G06F 21/6218; G06F 15/16–15/18; G06F 21/00; G06F 21/30–21/46; G06F 21/60–21/645; G06F 2221/033; G06F 9/00; G06F 21/55; G06F 21/62; H04L 9/00; H04L 9/32–9/3297; H04L 63/04–63/0492; H04L 63/08–63/0892; H04L 63/10; H04L 63/1408; H04L 63/1416; H04L 67/12; H04N 12/00
USPC .......................................................... 726/23
See application file for complete search history.

(56) References Cited

U.S. PATENT DOCUMENTS

| | | | | |
|---|---|---|---|---|
| 2007/0130621 A1* | 6/2007 | Marinescu | .............. | G06F 21/52 726/22 |
| 2009/0007256 A1* | 1/2009 | Raymond | .............. | G06F 21/33 726/19 |
| 2009/0164770 A1 | 6/2009 | Zimmer et al. | | |
| 2012/0266209 A1* | 10/2012 | Gooding | ................. | H04L 63/20 726/1 |
| 2014/0143889 A1* | 5/2014 | Ginter | ..................... | G06F 21/10 726/27 |

OTHER PUBLICATIONS

European Search Report dated Aug. 8, 2017, received for European Application No. 16152003.6.
Yeongung Park, Choonghyun Lee, Chanhee Lee, Jihyeog Lim, Sangchul Han, Minkyu Park, and Seong-Je Cho 2012. RGBDroid: A novel response-based approach to android privilege escalation attacks. In Proceedings of the 5th USENIX conference on Large-Scale Exploits and Emergent Threats (LEET'12). USENIX Association, Berkeley, CA, USA.

* cited by examiner

EXECUTING PROCESS CODE INTEGRITY VERIFICATON

CROSS-REFERENCE TO RELATED APPLICATIONS

This application claims priority under 35 U.S.C. § 119 from prior provisional application 62/247,131 filed on Oct. 27, 2015. The entire collective teachings thereof being herein incorporated by reference.

FIELD OF THE DISCLOSURE

The present disclosure generally relates to computer security, and more particularly to identifying unauthorized software modifications.

BACKGROUND

Computing devices often include software modules, such as operating systems, drivers, and other types of modules, that control aspects of the device's operation that are not accessible to all software executing on the device. These software modules are usually provided by the manufacturer or other provider of the device. In general, these software modules are protected by various techniques so that they are not altered from their original content as provided by their source.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
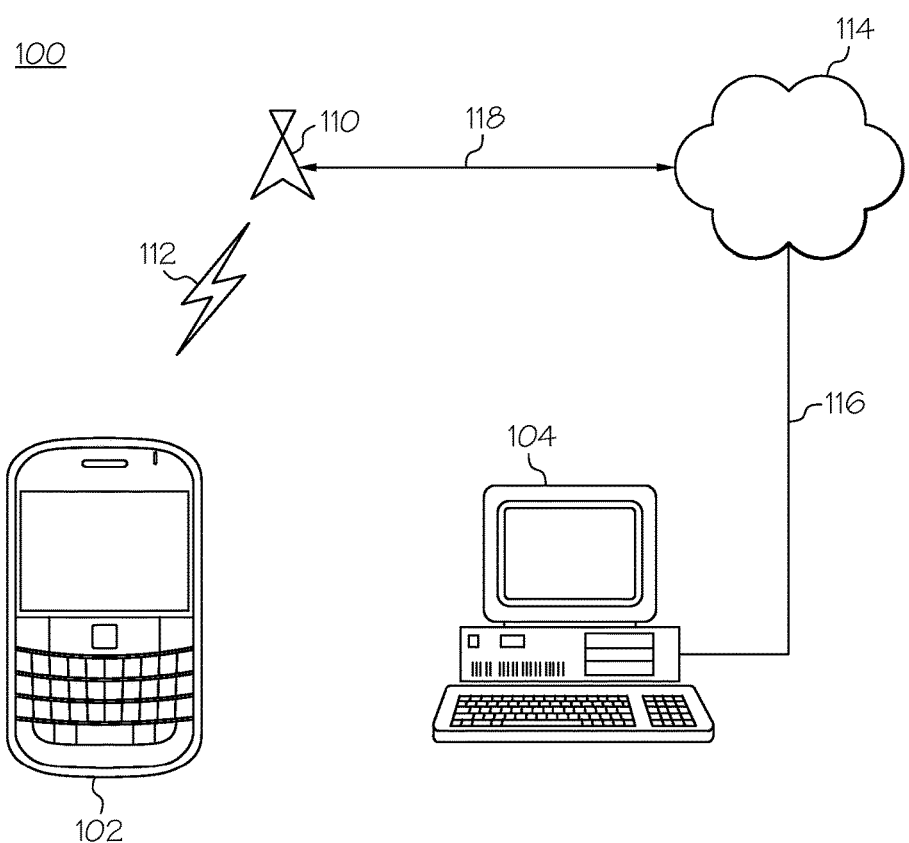
FIG. 1 illustrates a computing environment, according to an example.

Detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

Computing devices include various software modules, such as operating system components, drivers, software modules to implement various operational aspects, other software modules, or combinations of these, that control various operations of the computing device. These software modules often operate with elevated privileges or permissions in order to access hardware, various functions, or combinations of these that are not accessible by other software components such as user programs. Some of these software modules are started when the computing device is powered on or otherwise initializes itself. Although some of these software modules begin execution when the device initializes, such software modules are able to be started at any time. Additionally, executing software modules are able to stop and restart during normal device operations. Further, these software modules that are operating with elevated privileges or permissions are able to start other processes that are also granted elevated privileges or permissions.

The reliability and security of a computing device may be compromised by unauthorized operations performed by certain types of software. For example, a user may unknowingly install various types of malware that attempt to gain access to normally prohibited operations that are normally accessible only to software modules operating with elevated privileges. One technique used to gain unauthorized access to normally privileged operations is for an unauthorized software module patch executable code while the process is running in main memory. For example, an unauthorized software module is able to compromise the security of a device by modifying a vulnerable authorized software module that is legitimately operating with elevated privileges. In one example, the unauthorized software module injects new executable code into the memory space of that authorized software module. This injected new executable code is then able to operate with escalated privilege, is able to gain access to sensitive areas, perform other normally prohibited operations, or any combinations of these. Such an attack disguises the unauthorized, possibly malicious, code as being part of a trusted program. A device that has been successfully attacked in this manner could allow the unauthorized software to, for example, steal data, masquerade as a trusted application, form a stepping stone towards a larger scale attack or corporate data breach, perform other normally unauthorized operations, or combinations of these.

The below described systems and methods in an example operate to monitor executing software processes to determine if they have been modified while they are executing. In an example, software processes executing with elevated privileges are monitored and detected modifications are reported to other monitoring software. The monitoring of executing software processes is able to detect, for example, modifications to the memory space of these executing software processes to identify suspicious modifications that may indicate malicious or at least unauthorized operations on the computing device.

In various examples, some devices begin operations with a system startup phase during which device initialization occurs and the execution of some privileged processes is started. Devices are able to enter a system startup phase based on various conditions or events, such as the device's being powered up, being reinitialized, when other events or conditions occur, or combinations of these. The software executing during this startup phase is normally limited to a defined set of software processes that initialize the device and start fundamental or other processes used to support general device operations. During the startup phase, user software or software not provided by the system manufacturer or other trusted sources are not usually executed.

An example of a system startup phase is a "booting state" where many system processes and trusted executable software modules are launched. The software modules defining these system processes and trusted executable software modules in one example are validated by various techniques and are able to be trusted as genuine and not modified. In an example, these software modules often stored along with a digital signature that is provided by the source of those software modules. The authenticity of the software module, and assurance that it has not been modified in an unauthorized manner, is able to be validated by verifying the digital signature with the presently stored software module. This validation of some or all of the software modules is able to be performed prior to starting the execution of a particular software module. Such validation is able to be performed in an early stage of the booting process.

After these initial system processes and trusted executable software modules are launched, the system generally transitions from the system startup phase to a device operational phase. The device operational phase generally follows the system startup phase and is a state in which any or most software present on the device is able to execute. The transition to the device operational phase in an example occurs after all of the device operating system and other support software, some of which operates with elevated privileges, has started execution.

In an example, the below described systems and methods operate to create a representation of a starting snapshot of the memory of the computing device after the operating system and other support software has started executing, but before entering the device operational phase. This starting snapshot is considered to be created during the system startup phase because it is captured during prior to the device operational phase, which is to say that this starting snapshot is captured prior to user software or other generally present software is allowed to begin execution. This starting snapshot aggregates data from many points within the memory of the device and captures a description of active portions of the system memory when the system is operating in trusted state as is present during the system startup phase.

When the system is in the device operational phase, representations of a present snapshot those same portions of the system memory captured for the starting snapshot are also iteratively created at various times. The data from the starting snapshot, which is the snapshot captured during the system startup phase, is compared to the captured present snapshots during the device operational phase to determine if the memory locations being used by those executing processes have changed. Any differences in these two snapshots are able to be attributable to changes in those portions of the system memory. These changes are reported in one example to monitoring software that is able to take action based on this determination. Examples of actions taken based on determining the two snapshots are different include, but are not limited to, providing a notification of suspicious alteration of the device's operating system, limiting the functions that the device is able to perform, changing one or more operating modes of the device, changing the device's operation into a failsafe mode, any other action, or combinations of these.

In some examples, creating a snapshot of memory includes determining a fingerprint, such as hash value, of the memory space of each privileged process that is running at the time of creating the snapshot. In one example, the capturing a snapshot includes determining a fingerprint for each executing process within one or more processes. In an example, the fingerprints are captured for privileged processes that are operating at the end of the system startup phase and before a transition to the device operational phase. Determining the fingerprint of memory for an executing process is able to include scanning the values stored in the executable sections of each executing process' memory space, and determining a respective value that is able to determine if values in that memory space have changed. For example, a checksum or hash value is able to be calculated for the values stored in part or all of the memory space of the executing process. In an example, respective hash values are calculated according to the SHA256 digital signature algorithm for the values stored in the memory of each process' memory space. Such a snapshot in some examples consists of a respective cryptographic hash value corresponding to the memory space of each process' memory space and results in a unique fingerprint of the memory section.

In an example, starting fingerprints of memory are determined for each process executing after all of the initial processes are started in the system startup phase. During the device operational phase, a monitoring process is able to execute periodically, at certain times, at defined times, at any time, or combinations of these, to determine the present fingerprint of the executing processes based on the values stored in the memory locations associated with each executing process. This monitoring process in one example scans the memory space of all of the presently executing privileged processes that were present when the starting fingerprints were captured. Each of these processes in an example is scanned a new present fingerprint, such as the above described cryptographic hash value, is determined and compared to the corresponding starting fingerprint that was determined during creation of the snapshot at the end of the system startup phase. If at any point the hash values in these fingerprints do not match, a report is generated indicating the process with a memory space having a different hash value than was initially calculated during the system startup phase.

In addition to determining whether processes have been modified, the below described systems and methods further monitor and keep track of various events associated with processes that are operating with elevated privileges. In an example, a privileged process monitor operates to monitor when a process with elevated privileges starts, stops, crashes, or combinations of these. Further, the privilege process monitor determines when a process elevates its privileges during execution. The privilege process monitor in one example maintains a dynamic list of processes that are executing with elevated privileges.

In an example, a startup script that starts various processes to support device operations is executed during the system startup phase. The privileged process monitor in one example allows this startup script to execute with elevated privileges and to start other processes that will have elevated privileges. Further, the privileged process monitor allows processes that were started by the startup script with elevated privileges to also start other processes with elevated privileges. After the system startup phase, and during the device operational phase, the privileged process monitor is notified in one example when processes with elevated privileges start or when a process elevates it privileges. In an example, this allows the privileged process monitor to dynamically create a whitelist of processes that are authorized to operate with elevated privileges.

In some examples, applications are able to start during the device operational phase with elevated privileges, some applications that are able to elevate their privilege levels during the device operational phase, or both. Such applications in one example include processing to notify the privileged process monitor of events such as the application's starting, elevating its privileges, or both. The ability of these applications to communicate with the privileged process monitor in some examples is controlled by system privileges. In an example, privileges defined by some operating systems, such as SELINUX, are able to restrict which processes are able to communicate with the privileged process monitor in order to report that the process is starting with elevated privileges, is elevating its privileges, or both. This limits the processes that are able to legitimately start with elevated privileges or that can elevate their privileges to those with the operating system privileges that allow communications with the privileged process monitor. In an example, processes that do not have operating system privileges to communicate with the privileged process monitor would not provide notifications of their starting with privileged status or of elevating their privileges. Because the privileged process monitor would not receive such notifications, the process monitor would not include that process on a list of authorized privileged processes and the non-listed process could be identified as unauthorized.

In some examples, the below described systems and methods that operate during the device operational phase to control which processes are able to start with elevated privileges, which processes are able to elevate their privilege levels, or both. In an example, the above described dynamic whitelist created by the privileged process monitor includes information for the executing processes that define, for example: 1) if the process is able to execute with root privileges; 2) if the process is able to execute with system privileges; 3) if the process is authorized to spawn one process with elevated privileges; or 4) if the process is able to spawn processes that operate with elevated privileges where those spawned processes are also authorized to spawn further child processes with elevated privileges. The information defining these authorizations is able to be provided by any suitable technique, such as defined lists of applications or processes with these authorizations.

The privileged process monitor in some examples is able to report events associated with processes starting with elevated privileges or processes that elevate their privileges, log these event, operate with other elements of the device to respond to these events, perform other actions, or combinations of these. In an example the privileged process monitor creates reports of these events and sends those reports to a device monitoring process. In some examples, the privileged process monitor digitally signs these reports and stores them into a controlled database. In an example, the digitally signed reports are stored in a protected location such as a portion of device memory that is only cleared when the device's data partition is cleared. In some examples, the device is configured to only clear the portion of memory storing the when the device undergoes a complete security "wipe," which returns the device to its original state. In some examples, the protected location storing the digitally signed reports are stored in a location or database that is protected with operating system permissions and is guarded to ensure only the owner of the files can access the files.

FIG. 1 illustrates a computing environment 100, according to an example. The computing environment 100 depicts two electronic devices, a portable electronic device 102 and a computer 104. In general, these electronic devices are used by individuals to perform various functions. These electronic devices are examples of devices that include data storage used to store applications, user data, system data, other data, or combinations of these. The illustrated electronic devices are only examples used to illustrate certain relevant aspects in this description and are not limiting. In general, a large variety of any type of suitable electronic device is able to incorporate data storage and one or more processors that use data stored in the data storage to perform restricted operations within the device. It is to be understood that the systems and methods described herein are applicable to any computing device that restricts some operations.

The depicted electronic devices are shown to be able to perform electronic communications with each other and with other devices (not shown) via a communications network 114. The portable electronic device 102 is in wireless communications with a wireless base station 110 via a wireless link 112. A wireless base station 110 is depicted for ease of understanding and description, but is understood to represent one or more wireless communications systems. Examples of communications system using a wireless base station 110 include long range wireless communications such as cellular communications systems, wide area wireless network systems, any other long range wireless communications system, or combinations of these. The wireless base station 110 is also able to include one or more shorter range wireless communications systems such as WiFi®, Bluetooth®, Near Field Communications (NFC), any other short range system, or combinations of these.

The wireless base station 110 and the computer 104 are connected to a communications network 114. Examples of the communications network 114 include, but are not limited to, the Internet, data communications networks connecting selected locations, any accessible network, any data communications network, or combinations of these. The computer 104 in the illustrated example is connected to the communications network 114 by a wired link 116. The wireless base station 110 in the illustrated example is connected to the communications network by a second wired link 118. The use of a simple link in this illustration is for ease of understanding and explanation, but it is understood that electronic devices and wireless nodes, such as the computer 104, wireless base station 110, other devices, or combinations of these, are able to be connected to the communications network 114 by any suitable technique. Particular connections to the communications network is able to be via, for example, sub-networks that include one or more of wired connections or wireless connections.

The electronic devices, such as the portable electronic device 102 or computer 104, include processors that are able to execute, for example, user software to perform various functions. In some examples, user software is able to be received via the communications networks and loaded into the electronic device. These electronic devices generally have certain restricted functions or other operating aspects that are not accessible to user software. These restricted functions in some examples control the operation or configuration of the electronic device, store sensitive or personal information, are associated with other sensitive operations or data, or the certain functions are able to include combinations of these. In general, the electronic devices have, for example, operating systems, drivers, other software, or combinations of these, that are able to access the restricted functions or other operating aspects of the electronic device that are generally not accessible to other software that is executing on the electronic device. In some examples, operating system permissions or similar constructs are used to identify which software that is able to access the restricted functions or other operating aspects of the electronic device.

Figure 2:
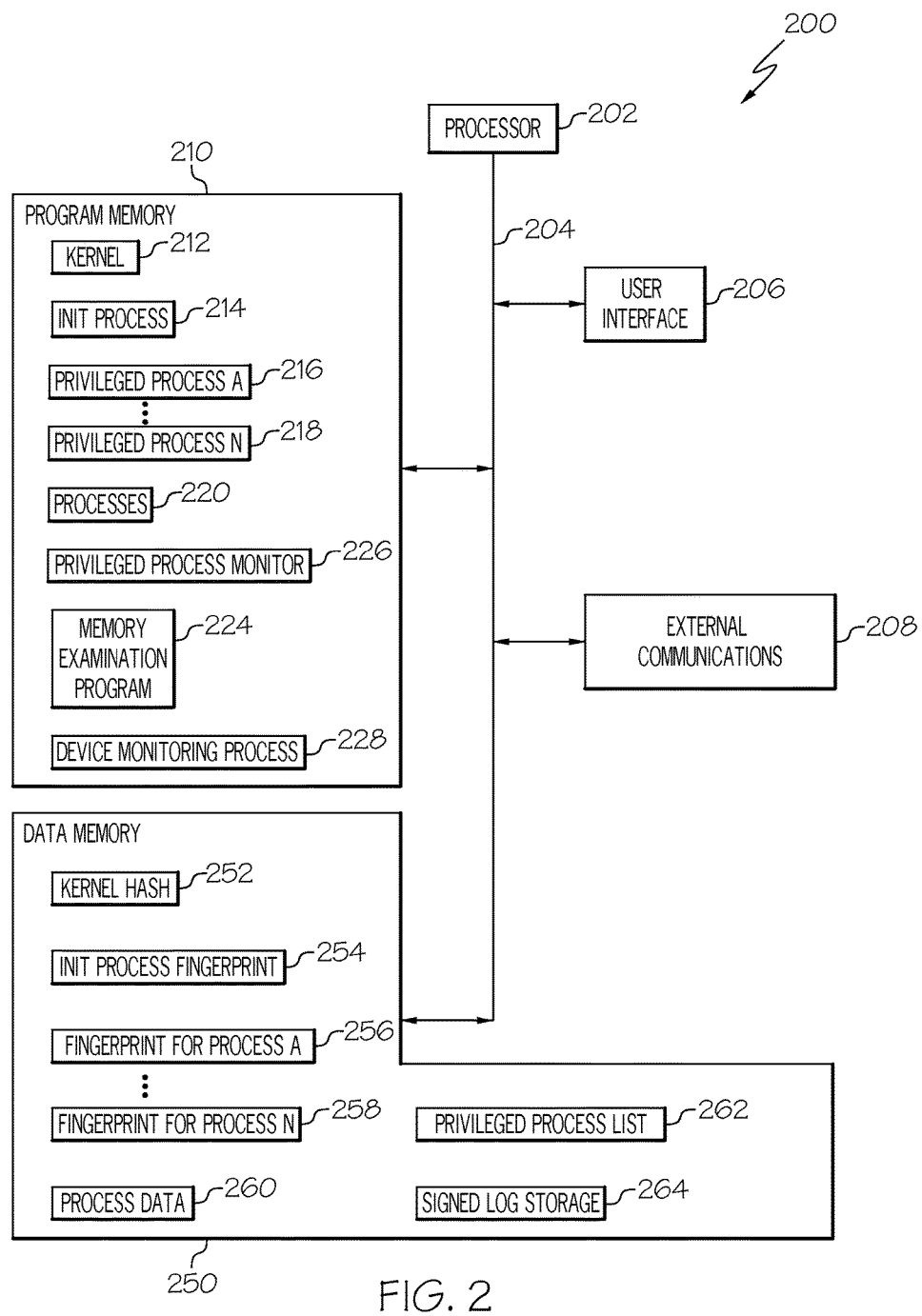
FIG. 2 illustrates an electronic device block diagram, according to an example.

FIG. 2 illustrates an electronic device block diagram 200, according to an example. The electronic device block diagram 200 depicts certain components of a communications device, such as examples of a portable electronic device 102 or computer 104 discussed above. The electronic device block diagram 200 includes a processor 202 that performs the various processes implemented by the electronic device. The processor 202 interacts with other components of the electronic device block diagram 200 via a data bus 204. In the illustrated example, the processor 202 interacts with a user interface 206, external communications 208, a program memory 210, and a data memory 250. In further examples, an electronic block diagram 200 is able to include other components or is able to include fewer components than are illustrated in this example.

The user interface 206 in one example is able to include one or more facilities to allow a user to provide information to, or receive information from, the electronic device. The user interface 206 is able to support one or more types of user interaction, such as one or both of visual or audio outputs, one or both of touch inputs or voice recognition, other user interface techniques, or any combination of these.

The user interface 206 in one example includes visual displays such as graphical display screens, alphanumeric displays, visual displays of any nature, or combinations of these. The user interface 206 further provides any suitable user input facilities, such as physical keyboards, touch screen displays that may or may not include virtual keyboards, voice recognition, other input facilities, or combinations of these. In general, the user interface 206 is able to include components to support any type of user interaction with the electronic device, such as providing information to and presenting information from executable software operating on the processor 202.

The external communications component 208 in various examples is able to support any suitable type of communications between the electronic device and other devices, such as over the wireless link 112 or wired link 116 described above. The external communications component 208 in some examples is able to include long range wireless links such as voice or data communications over one or more cellular phone infrastructures, other long range wireless data links, other long range wireless voice links, or combinations of these. The external communications component 208 in some examples is able to include short range wireless communications. In some examples, the external communications is able to support Wi-Fi®, Bluetooth®, Near Field Communications (NFC), any other short range system, or combinations of these.

The program memory 210 in one example stores data in any suitable format that defines executable software that defines various processes, applications, other executable modules, components, or other structures, or combinations of these. In the following discussion, the term program memory is used in one example to refer to the portion of a device memory from which processor 202 retrieves program instructions that are then executed by the processor 202 in order implement a particular software process. An executing process in this discussion refers to a software process that is considered to be executing on the processor 202. An executing process may or may be in a state of active execution by the processor 202. For example, an executing process may be in a dormant or in a state that may be instantaneously inactive, but is generally considered to be executing as is understood by practitioners of ordinary skill in the relevant arts.

The illustrated program memory 210 depicts several executing software components. These executing software components in one example are data that include computer executable instructions to perform various functions, operations, or both, defined for those components. The executing software components shown in this depiction are examples of executing processes. In general, the program memory 210 of various devices is able to be modified during device operations, but such modifications are normally limited to specific circumstances. For example, modification of the program memory 210 is expected and authorized when new or updated software is being loaded into the device. In addition to such authorized modifications of program memory, unauthorized programs are able to modify programs stored in the program memory 210. Such unauthorized modifications of program memory, particular to the program code defining processes that execute with elevated privileges, may have potentially harmful effects on the device.

The illustrated program memory 210 stores a kernel 212, and an init process 214. The kernel 212 is generally the basic operating system component for an electronic device. The init process 214 is generally a process that is executed to initialize the software operating environment of a device. In some examples, the init process 214 is executed during the system startup phase that is performed as part of the powering up or starting up of a device, as part of a device restarting or re-initialization process, during other events, or during combinations of these.

The program memory 210 further stores several privileged processes including privileged process A 216 and privileged process N 218. In general, some privileged processes are started by the init process 214 when the init process 214 is executed. The several privileged processes are able to, for example, access generally restricted functions or other operating aspects of the device. A device is generally able to have any number of privileged processes. Some or all of the privileged processes are able to be started by the init process 214, but some of these and other privileged processes are also able to be started or restarted at any time during device operations. In general, a device's memory stores permission indications or privilege information for one or more stored data items and privileged processes have permission indications or privilege information that indicates the status of that process to execute with elevated privileges. In the present discussion, processes are described as operating with elevated privileges if the operating system of the device is configured to permit the process to access functions, operations, any other aspect, or combinations of these, of the device that is not generally available to all software executing on the device.

The program memory 210 further includes a memory examination program 224. The memory examination program 224 in one example operates to ensure the integrity of the privileged processes that are executing on the device, as is described in further detail below. In various examples, the memory examination program 224 is able to determine a fingerprint for an executing process by examining memory locations associated with that executing process and calculating a hash value for the values stored in those memory locations. In various examples, the memory examination program 224 determines fingerprints for memory that includes one or more of: program memory storing program code executed by the processor to execute the executing process; data memory used by the executing process; a subset of program code executed by a processor to execute the executing process, or combinations of these. The memory examination program 224 in some examples includes a fingerprint processor and a reporting processor to perform some of the operations described below.

The program memory 210 further includes a privileged process monitor 226. The privileged process monitor 226 in one example operates to monitor when a process with elevated privileges starts, stops, crashes, or combinations of these. Further, the privilege process monitor 226 determines when a process elevates its privileges during execution. In the following discussion, a privileged process is said to start if the process is started with elevated privileges, if an executing process elevates or changes it privileges, if the privileges of the process change in any way, or combinations of these. The privileged process monitor 226 in one example maintains a dynamic list of processes that are executing with elevated privileges. In an example, the privilege process monitor 226 receives notifications when a privileged process starts, which includes notifications of a starting of a new process that is executing with elevated privileges, notifications of a new process being spawned from a parent process for execution with elevated privileges, an already executing process that alters its privilege level while executing, other circumstances where a process beings to operate with elevated privileges, or combinations of these.

In an example, the privilege process monitor 226 allows the init process 214 to execute with elevated privileges and to start other processes with elevated privileges. Further, the privileged process monitor 226 allows processes that were started with elevated privileges by the init process 214 to also start other processes with elevated privileges. In some examples, the privileged process monitor 226 receives notifications of from the init process 214 when processes are started with elevated privileges, or when processes are started that are allowed to execute with elevated privileges, and creates a privileged process list as is described below. After the system startup phase, including during the device operational phase, the privileged process monitor 226 receives notifications in one example when processes with elevated privileges start or when a process elevates it privileges. In an example, this allows the privileged process monitor 226 to maintain the privileged process list 262 within the data memory 250 that is discussed in further detail below. The privileged process list 262 in one example is a dynamically maintained whitelist of processes that are authorized to operate with elevated privileges.

In some examples during the device operational phase, some applications are able to start, or spawn, other processes with elevated privileges or to elevate the privilege levels of some executing processes, or both. The processes of such applications in one example include processing to notify the privileged process monitor 226 of events such as the process' starting, elevating its privileges, or both. The ability of the processes of these applications to communicate with the privileged process monitor 226 in some examples is controlled by system privileges. In an example, privileges defined by some operating systems, such as SELINUX, are able to restrict which processes are able to communicate with the privileged process monitor 226 in order to report that the process is starting with elevated privileges, is elevating its privileges, or both. This limits the processes that are able to legitimately start with elevated privileges or that can elevate their privileges to those with the proper operating system privileges.

In some examples, the below described systems and methods operate during the device operational phase to monitor, control, or both, which processes, such as processes within the processes 220, are able to start with elevated privileges, which processes are able to elevate their privilege levels, or both. In an example, the above described dynamic whitelist created by the privileged process monitor 226 includes information for the executing processes that define, for example: 1) if the process is authorized to execute with root privileges; 2) if the process is authorized to execute with system privileges; 3) if the process is authorized to spawn one process with elevated privileges; 4) if the process is authorized to spawn processes that operate with elevated privileges where those spawned processes are also authorized to spawn further child processes with elevated privileges; or combinations of these. The information defining these authorizations is able to be provided by any suitable technique, such as by one or more defined lists of applications or processes with these authorizations.

The privileged process monitor 226 in some examples is able to report events associated with processes starting with elevated privileges or processes that elevate their privileges. The privileged process monitor 226 is also able in some examples to log these events, operate with other elements of the device to respond to these events, perform other actions, or combinations of these. In an example the privileged process monitor 226 creates reports of these events and sends those reports to a device monitoring process 228, as is described below. In some examples, the privileged process monitor 226 digitally signs these reports and stores them into a protected location. The signed log storage 264, discussed in further detail below, is an example of such a protected location. In an example, these digitally signed reports or logs are stored in a protected portion of device memory that is only cleared when the device's data partition is cleared. In some examples, the device is configured to only clear this portion of the data partition when the device undergoes a complete security "wipe," which returns the device to its original state. In some examples, the digitally signed logs are stored in a protected location that is protected with operating system permissions and is thus guarded to ensure only certain processes, such as processes of the owner of the files, can access the files.

The illustrated program memory 210 includes a device monitoring process 228. In various examples, the device monitoring process 228 performs various functions to monitor the operations of the device. The device monitoring process 228 in one example includes or is part of Mobile Device Management (MDM) functionality to monitor and control various aspects of mobile devices. In an example, the memory examination program 224 is able to report to the device monitoring process 228 any determined differences between starting fingerprints and present fingerprints. The device monitoring process 228 is able to be configured to take various actions based on such a report.

The illustrated program memory 210 further includes other processes 220. The other processes 220 are able include user programs or programs that do not operate with elevated privileges.

The data memory 250 stores data that is used by the executable software to perform various functions, operations, or combinations of these. The illustrated data memory 250 includes a kernel hash value 252, an init process fingerprint 254, and fingerprints for the several privileged processes such as the fingerprint for process A 256 and fingerprint for process N 258. The fingerprints stored in the data memory 250 are each associated with one or more processes stored in program memory 210. In one example, a separate hash value based on the SHA256 algorithm is calculated for each privileged process stored in program memory, and that hash value is stored in the data memory as the fingerprint for that process. In further examples, one or more fingerprints stored in the data memory 250 are able to contain a hash value that is calculated over the program memory storage of more than one process. In general, the fingerprints stored in the data memory 250 are able to consist of any data that is able to identify that the program code stored in the program memory for its associated process has not been altered.

The data memory 250 further includes process data 260. Process data 260 is data used by processes executing on the processor 202. Examples of processing using data in the process data 260 include the init process 214, privileged process 216, processes 220, and a memory examination program 224. Data in the process data 260 is able to be created by, modified by, otherwise used by, or combination of these by its associated processes. In some examples, the data used by a particular process is stored separately from the data used by other processes and access to the data of a particular process is limited to the process using that data, to other processes with privileges to access the data, or combinations of these. In an example, the memory examination program 224 is also able to determine fingerprints of data memory used by an executing process. The data memory used by an executing process is able to include all of the data memory being accessed by the executing process, a defined portion of the data memory being accessed by the executing process, a subset of the data memory being accessed by the executing process, other portions of the data memory associated with the executing process, or combinations of these.

The data memory 250 also stores the privileged process list 262, which is discussed above, and a signed log storage 264. The signed log storage 264 in an example is a protected location. In an example, the signed log storage 264 is stored in a protected portion of device memory that is only cleared when the device's data partition is cleared. In some examples, the device is configured to only clear the data partition storing the signed log storage 264 when the device undergoes a complete security "wipe," which returns the device to its original state. In some examples, the signed log storage 264 is protected with operating system permissions and is guarded to ensure only certain processes, such as processes associated with the owner of the files, can access the files.

Figure 3:
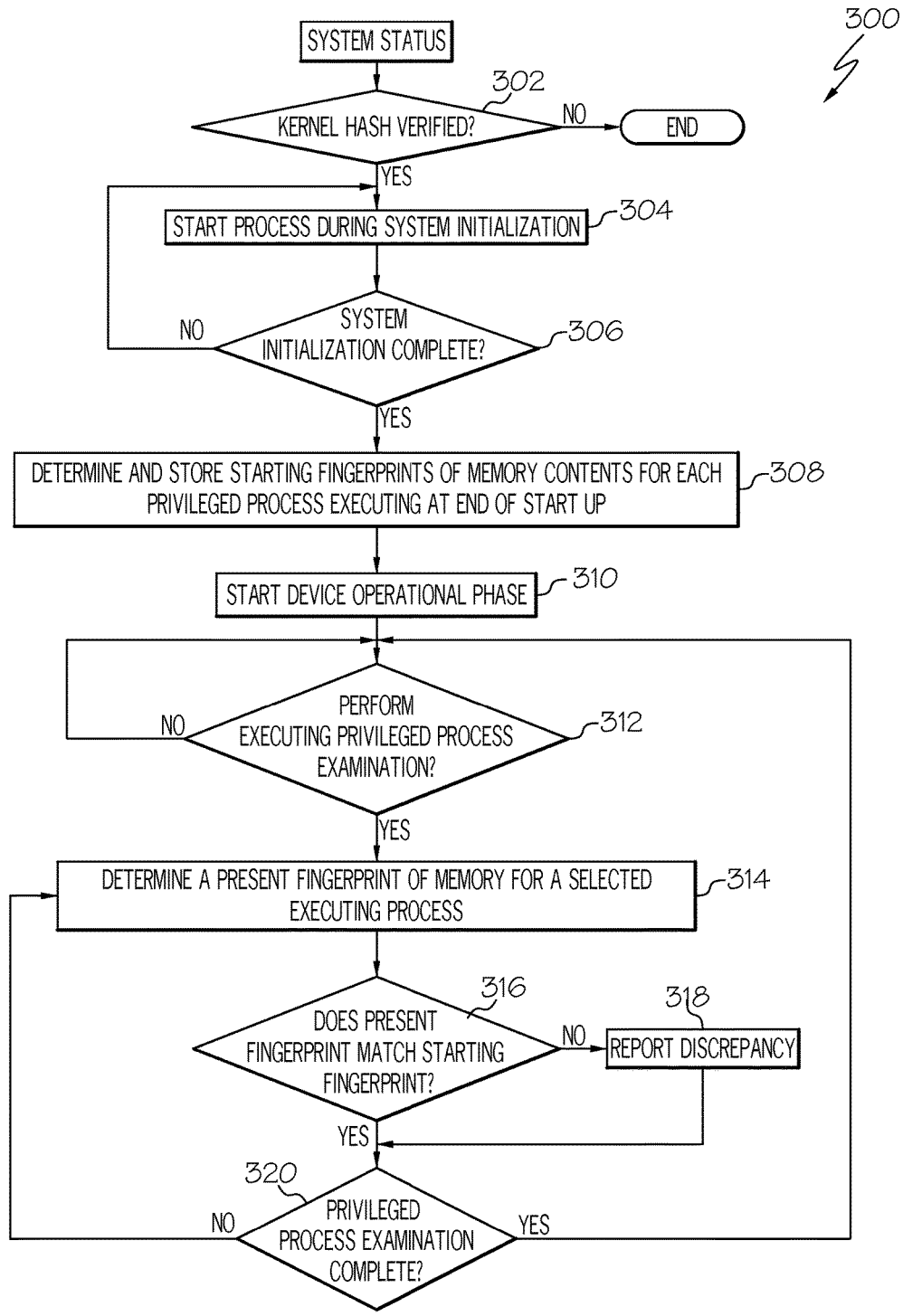
FIG. 3 illustrates a privileged process modification monitoring method, according to an example.

FIG. 3 illustrates a privileged process modification monitoring method 300, according to an example. The privileged process modification monitoring method 300 is described with reference to the electronic device block diagram 200 described above. The privileged process modification monitoring method 300 is performed in one example by the processor 202. In an example, the privileged process modification monitoring method 300 starts during the system startup phase and continues into the device operational phase.

The privileged process modification monitoring method 300 in some examples determines, at 302, if the kernel hash value is verified. Verification of the kernel in some examples may be performed by various techniques and may not be considered to be a part of the privileged process monitoring operations of the device. In general, the organization providing the kernel 212 also provides a cryptographic hash value for the data defining the kernel 212. In an example, the kernel hash 252 stored in the data memory 250 includes the cryptographic hash value that is provided by the organization providing the kernel 212. Determining if the kernel hash value is verified in an example includes comparing the stored kernel hash value 252 to a hash value calculated for kernel 212 presently stored in the program memory 210, and is thus the kernel executing on the processor 202. Discrepancies between these hash values indicate that the kernel has been modified after the kernel hash value 252 was calculated. If the kernel hash value is not verified, the privileged process modification monitoring method 300 ends.

If it is determined that the kernel hash process is verified, the privileged process modification monitoring method 300 continues by starting, at 304, processes during system initialization. In an example, these processes are started by the init process 214 as is described above. The init process 214, and some or all of the processes started by the init process, execute with elevated privileges. The privileged process modification monitoring method 300 determines, at 306, if the system initialization is complete. If it is determined system initialization is not complete, the processing returns to starting, at 304, processes as is described above. In an example, there is a defined set of processes that are started during the system startup phase. This defined set of processes in one example is defined by configuration information of the init process 214.

In some examples, the starting of processes during system initialization occurs before other processes, such as user processes, are able to execute. As such, these processes are started during the system startup phase. In general, the processes that are executing at the end of system startup are in a state that is would not be able to be modified by a user process or other unauthorized process. Further, the verification of the kernel hash 252, as was determined at 302, ensures the integrity of the kernel.

If it is determined that the system initialization is complete, the privileged process modification monitoring method 300 in one example determines and stores, at 308, the starting fingerprint of memory contents for each executing privileged process that is executing at this time. In this example, the starting fingerprints for the executing privileged processes are determined after all of the processes that are started in the system startup phase have been started. In further examples, a starting fingerprint for a particular process is able to be determined at any point after that particular process starts. In one example, these starting fingerprints are determined prior to entering the device operational phase, and are therefore considered to be determined during the system startup phase.

In an example, these starting fingerprints each include a respective hash value that is calculated over the data stored in the memory of a respective process that is executing at the end of system startup. In some examples, the fingerprint of a particular process includes a hash value for the data stored in the program memory 210 that defines the program code for that process. In some examples, a fingerprint for a particular process includes one or more hash values for the data stored in both the program memory 210 and the process data 260 that is stored in the data memory 250 for that particular process. In some examples, the fingerprint for a process is able to include one or more hash values for only a subset of data stored in memory associated with that particular process.

In general, the fingerprint is able to include one or more of these hash values, or any other value, that allows verification that the memory associated with the fingerprint has not been modified. The determined fingerprint is stored in one example in the data memory 250, such as in the fingerprint for process A 256, described above. In one example, a separate fingerprint is stored in the data memory 250 for each process executing at the end of system startup.

The device operational phase then starts, at 310. In general, the device operational phase a mode of device operations that is entered after the system startup phase, which includes the device startup and initialization processing of the preceding processing as is described above. The device operational phase includes an operating mode that allows other process, such as user processes, to be executed by the processor 202. In general, the device operational phase is a mode of operations where there is a possibility of unauthorized modification of privileged processes by these other processes that are allowed to execute in this phase. As is described below, the privileged process modification monitoring method 300 includes processing to monitor the privileged processes that were started during the system startup phase, such as at device initialization, to determine if any modifications have occurred to their data.

After starting normal operations, the privileged process modification monitoring method 300 determines at 312, if privileged process examination is to be performed. Privileged process examination is generally performed during normal operations based on the occurrence of one or more conditions. For example, a device is able to be configured to periodically perform privileged process examination. For example, a device is able to be configured to perform privileged process examination every four hours or other configurable time period. Privileged process examination is also able to be performed in response to a request from another application, from a user, from a remote monitoring system, from another source, or from combinations of these. This determination is repeated until it is determined that privileged process examination is to be performed.

If it is determined to perform privileged process examination, a present fingerprint of memory for a selected executing process is determined, at 314. In an example, the present fingerprint is determined for each executing process for which a starting fingerprint was determined. In an example, a selected process is the executing process for which a present fingerprint is being determined and that is currently being processed by the privileged process modification monitoring method 300. In general, a present fingerprint is determined at this time for each executing process that was executing at the end of the system startup phase, and for which a starting fingerprint was initially determined above, at 308. In general, the present fingerprint determined at this stage is determined for the same memory range and according to the same algorithm used to determine the starting fingerprint at the end of the system startup phase.

A determination, at 316, is made whether the present fingerprint matches the stored starting fingerprint. In an example, this determination compares the recently determined present fingerprint determined at 314 to the starting fingerprint stored in the data memory for this process. If it is determined that these fingerprints do not match, the discrepancy is reported, at 318.

Returning to 316, if it is determined that the fingerprints match, or after reporting the discrepancy at 318, a determination is made as to whether the privileged process examination is complete. In an example, the privileged process examination is complete when all privileged processes for which fingerprints are stored in data memory 250 have been processed to determine that recently calculated fingerprints match those stored values. If it is determined that the privileged process examination is not complete, the privileged process modification monitoring method 300 returns to determining, at 314, a present fingerprint of memory for an executing privileged process. If it is determined that the privileged process examination is complete, the privileged process modification monitoring method 300 returns to determining, at 312, if a privileged process examination is to be performed. The privileged process modification monitoring method 300 in one examples iteratively repeats execution of this portion of the privileged process modification monitoring method 300 by returning to determining, at 312, if privileged process examination is to be performed and continuing as described above. In general, the privileged process modification monitoring method 300 continues in this manner for as long as the device is operating.

Figure 5:
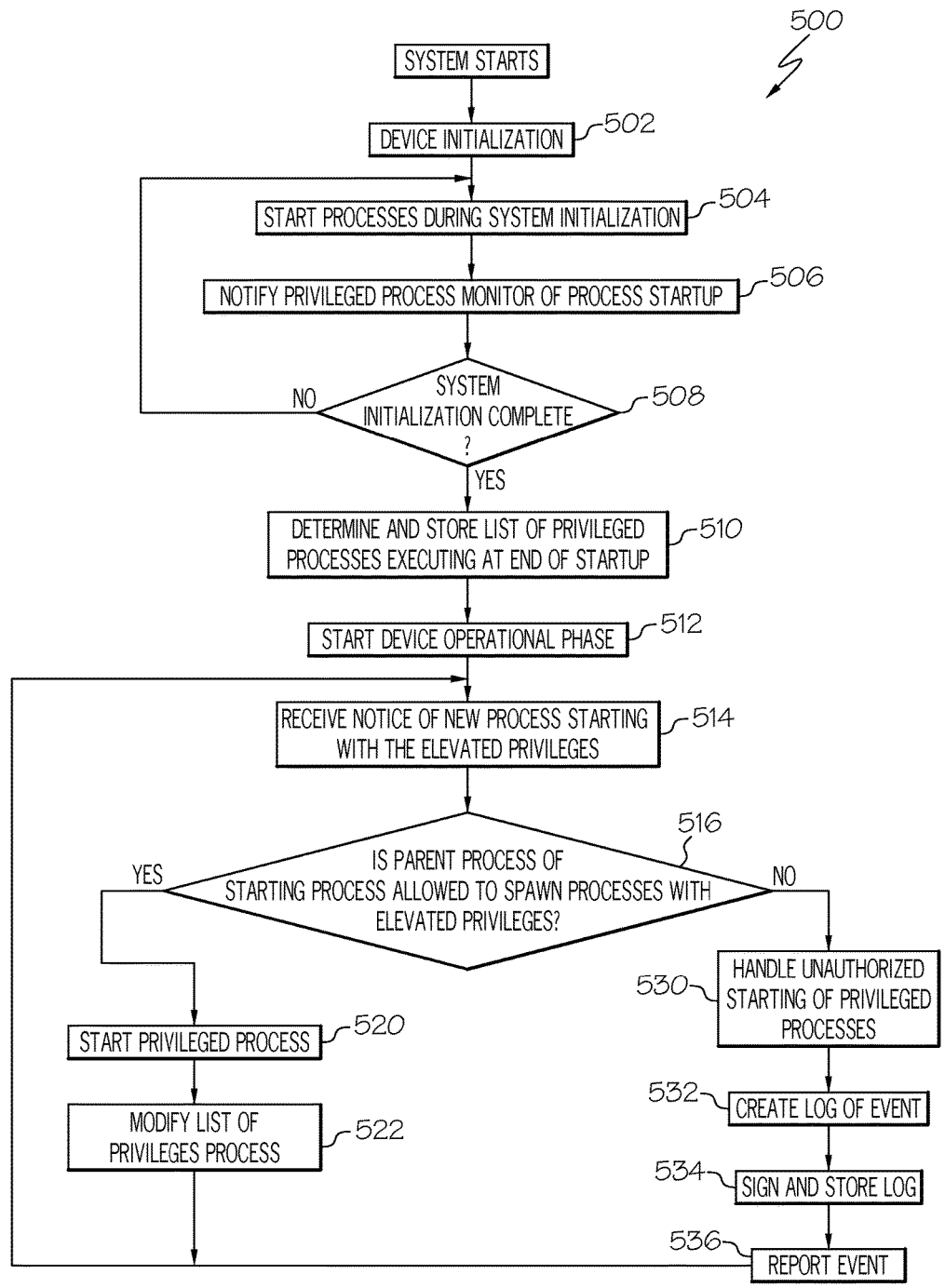
FIG. 5 illustrates a privileged process monitoring method, according to an example.

FIG. 5 illustrates a privilege monitoring method 500, according to an example. The privilege monitoring method 500 is described with reference to the electronic device block diagram 200 described above. The privilege monitoring method 500 is performed in one example by the processor 202. In an example, the privilege monitoring method 500 starts during the system startup phase and continues into the device operational phase. In some examples, some parts of the below described processing for the privilege monitoring method 500 is able to be performed in conjunction with the privileged process modification monitoring method 300, described above.

The privilege monitoring method 500 in some examples includes, at 502, device initialization. Device initialization is able to be performed to ensure that the hardware and other components of the device are in a known state prior to starting the device's software.

The privilege monitoring method 500 continues by starting, at 504, processes during system initialization. The privilege monitoring method 500 in some examples notifies, at 506, the privileged process monitor 226 of the starting of privileged processes. As discussed above, the init process 214 in some examples is able to include processing to notify the privileged process monitor 226 of processes that the init process 214 starts with elevated privileges. In some of these examples, the privileged process monitor 226 adds those processes to the privileged process list 262. In an example, the init process 214 is able to provide the privileged process monitor 226 with information regarding the authorization of the started process to, for example, execute with elevated privileges, spawn child processes that are also able to execute with elevated privileges, spawn lines of child processes where each child process is each able to spawn child processes itself that are able to execute with elevated privileges, or combinations of these. This information in an example is defined by a list of processes that have these or other abilities. This information is later checked, as described below, when a child process is spawned to determine if that newly spawned child process is authorized to execute with elevated privileges.

The privilege monitoring method 500 determines, at 508, if the system initialization is complete. If it is determined that system initialization is not complete, the processing returns to starting, at 504, processes as is described above. Some of these operations are similar to those discussed above with regards to the privileged process modification monitoring method 300. In some examples that include the processing of both privileged process modification monitoring method 300 and privilege monitoring method 500, these similar operations are performed only once. In some examples, these processes are considered to have been started during the system startup phase.

If it is determined that the system initialization is complete, the privilege monitoring method 500 in one example determines and stores, at 510, a list of executing privileged process that are executing at this time. In some examples, this list is compiled from the information provided by the init process 214 of processes that were started with elevated privileges. In an example, the init process 214 provides a notification to the privileged process monitor 226 when a new privileged process starts. In some examples, the privileged process monitor 226 records the privileged process into the privileged process list 262 when it is detected that the privileged process is started during the system startup phase. In further examples, this list is able to be compiled after all of the processes that are started in the system startup phase have been started. In further examples, this list is able to be compiled from information available at any point after the processes starts. In an example, determining the list includes recording the privileged process into the privileged process list 262.

The device operational phase then starts, at 512. As discussed above, the device operational phase is generally a mode of device operations that is entered after the system startup phase, which includes the device startup and initialization processing of the preceding processing as is described above. The device operational phase includes an operating mode that allows other process, such as user processes, to be executed by the processor 202. In general, certain processes are able to start with elevated privileges, elevate their privileges, or both, during the device operational phase.

After starting normal operations and entering the device operational phase, a notice is received, at 514, that a new process is starting with elevated privileges. In an example, a process that launches applications, such as the Zygote processes within the Android operating system, provides notifications to the privileged process monitor 226 that a process is being started or spawned with elevated privileges. In an example, notice is also received whenever a process assumes elevated privileges. For example, a process with elevated privileges is said to be started when a new process is starting to execute with elevated privileges, when an already executing process elevates its privileges, when a newly created or already existing process creates or changes any of its privileges, or combinations of these.

In an example, processes that are able to start with elevated privileges, request to have their privileges elevated, or both, are able to include processing to notify the privileged process monitor 226 when the process starts or when its privileges will change. In an example, this notification from the process regarding a process starting with privileges or elevating its privileges is an example of detecting, during the device operational phase, a new privileged process where the new privileged process assumes elevated privileges during the device operational phase. In an example, assuming elevated privileges includes either starting with elevated privileges or changing the privilege of an already executing process.

After receiving a notification that a new process with elevated processes is being spawned, it is determined, at 516, if the parent process of the starting process is allowed to spawn that child processes with elevated privileges. In one example, as described above, information is able to be associated with a privileged process that defines the permissions of a process with regards to an authorization to spawn further privileged processes. This information is able to include, for example, whether the process is authorized to spawn one process with elevated privileges, or whether the process is able to spawn processes that operate with elevated privileges and where those spawned processes are also in turn authorized to spawn further child processes with elevated privileges. In an example, the determination as to whether the starting process is able to start or to elevate its privileges is based on the privileges of the parent processes that is starting the starting process or had started the process attempting to elevate its privileges. The authorization of the parent process to spawn child processes with elevated privileges may depend upon authorizations of one or more levels of parent processes. For example, a process may have authorization to start child processes that are in turn able to start other processes with elevated privileges. Any processes spawned by these processes are then able to spawn further processes with elevated privileges. In general, any process in this case that is spawned by processes that trace back to an originating process with this authorization is able to spawn addition processes with elevated privileges.

If it is determined that the parent process of the starting process is allowed to spawn a child process with elevated privileges, the process is started with elevated privileges, at 520. The privileged process list 262 in an example is modified, at 522, to add the newly spawned or started process as a process that is authorized to execute with elevated privileges. In an example, this list of processes that are authorized to execute with elevated privileges is able to support determining if any processes that are executing with elevated privileges are unauthorized. Determining the existence of any unauthorized processes that are executing with elevated privileges may indicate a security breach or compromise, or other security problem that may be addressed by any suitable technique. The privilege monitoring method 500 then returns to receiving, at 514, notice of a new privileged process being spawned or started.

Returning to determining, at 516, if it is determined the parent process of the newly spawned process is not allowed to spawn that new child process with elevated privileges, the unauthorized starting of a privileged process is handled, at 530. In some examples, handling of an unauthorized starting of a privileged process includes, e.g., denying the starting of the child process, performing various processing to isolate or limit access to functions by the child process, any other processing, or combinations of these.

Determining, at 516, that the parent was not allowed to start the privileged child process in some examples also causes a log of the attempt to start that process to be created, at 532. In some examples the unauthorized privileged process is started and the starting of that process is included in this created log. Creating a log in this context includes, for example: adding an entry, such as a report, to an existing log; forming a data structure objects containing information about the event that is to be stored alone, in combination with other log data structure objects, or both; creating any entry memorializing the event; or combinations of these. In an example, this log or report is digitally signed to create a signed log and that signed log is then stored in a protected storage location, at 534. In an example, the log is digitally signed with a cryptographic signature that allows secure verification of the authenticity of the created log. In an example, the digitally signed log is stored in a protected memory database, such as the signed log storage 264 as is described above. In further examples the log data is able to be stored in, e.g., a limited access database, a trusted execution environment, an isolated and trusted data storage area such as is available within a Trusted Platform Module (TPM) or in an Trustzone® process, in any type of trusted storage location, or in combinations of these.

In an example, the privilege monitoring method 500 reports, at 536, that an unauthorized privileged child process was determined to have been started or spawned. In an example, the event is reported to the device monitoring process 228. The device monitoring process 228 is then able to take any suitable action based on the reporting of this event.

After reporting the starting of an unauthorized privileged process, at 536, the privilege monitoring method 500 returns to receiving, at 514, notice of a new privileged process being spawned or started. In general, the privilege monitoring method 500 continues in this manner for as long as the device is operating.

Figure 4:
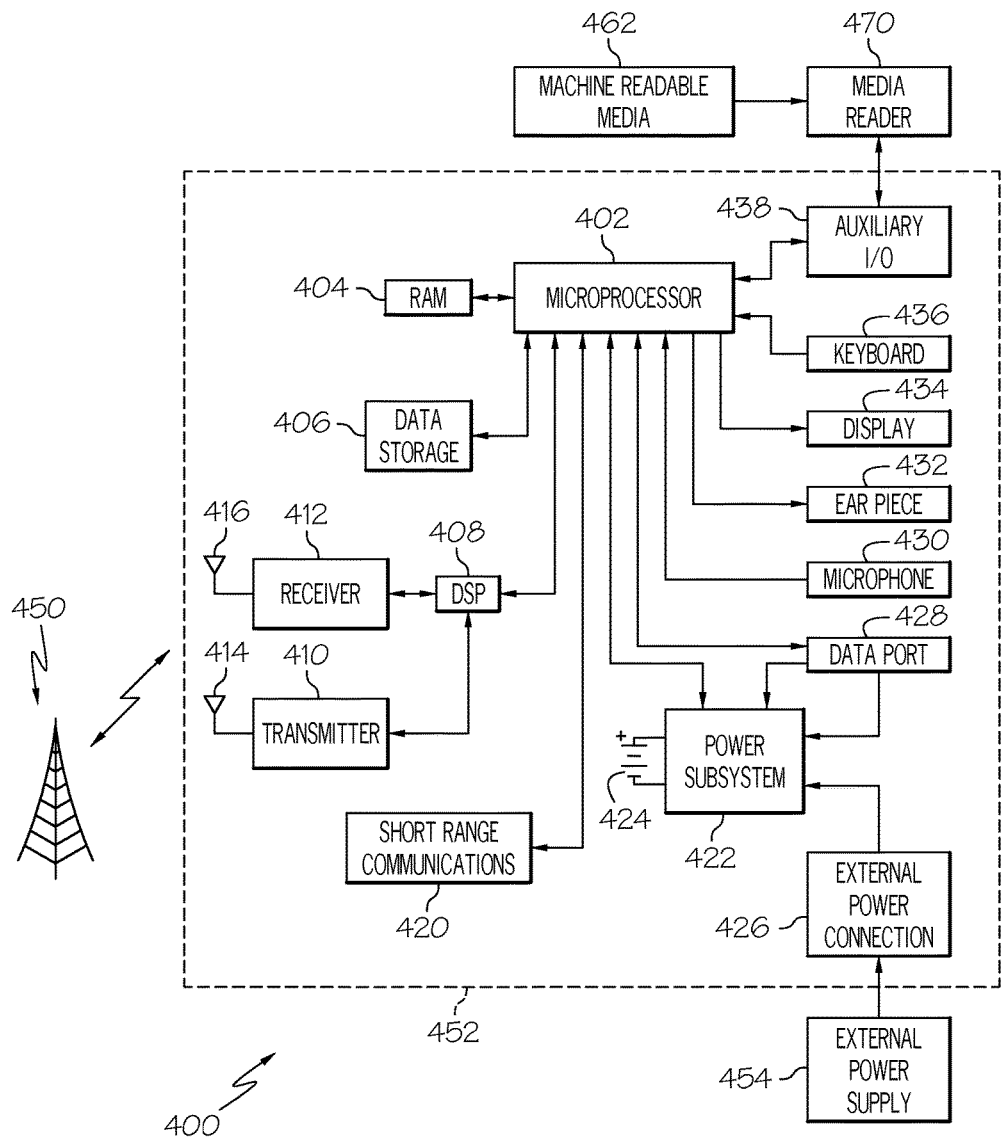
FIG. 4 is a block diagram of an electronic device and associated components in which the systems and methods disclosed herein may be implemented.

FIG. 4 is a block diagram of an electronic device and associated components 400 in which the systems and methods disclosed herein may be implemented. In various examples, the electronic device 452 is able to be an example of the above described portable electronic device 102, which is an example of a wireless two-way communication device with voice, text chat, and data communication capabilities. In some examples, electronic devices support data communications without supporting voice communications. For example, some electronic devices support data communications via a local data communications network, such as a WiFi® network. In some examples, devices may support voice communications via various technique, such as Voice over Internet Protocol (VoIP), using systems such as BlackBerry Messenger® Voice, other voice over data systems, or combinations of these. Such electronic devices communicate with a wireless voice, text chat, or data network 450 using a suitable wireless communications protocol. Wireless voice communications are performed using either an analog or digital wireless communication channel. Data communications allow the electronic device 452 to communicate with other computer systems via the Internet. Examples of electronic devices that are able to incorporate the above described systems and methods include, for example, a data messaging device, a two-way pager, a cellular telephone with text and data messaging capabilities, a wireless Internet appliance or a data communication device that may or may not include telephony capabilities.

The illustrated electronic device 452 is an example electronic device that includes two-way wireless communications functions. Portions of the above described external communications 208 are examples of these two-way wireless communications functions. Such electronic devices incorporate communication system elements such as a wireless transmitter 410, a wireless receiver 412, and associated components such as one or more antenna elements 414 and 416. A digital signal processor (DSP) 408 performs processing to extract data from received wireless signals and to generate signals to be transmitted. The particular design of the communication system is dependent upon the communication network and associated wireless communications protocols with which the device is intended to operate.

The electronic device 452 includes a microprocessor 402 that controls the overall operation of the electronic device 452. The above described processor 202 is an example of the microprocessor 402. The microprocessor 402 interacts with the above described communications system elements and also interacts with other device systems. In various examples, the electronic device 452 is able to include one or more of various components such as a data storage 406, random access memory (RAM) 404, auxiliary input/output (I/O) device 438, data port 428, display 434, keyboard 436, earpiece 432, audio sound reproduction system 470, microphone 430, a short-range communications system 420, a power system 422, other systems, or combinations of these.

One or more power storage or supply elements, such as a battery 424, are connected to a power system 422 to provide power to the circuits of the electronic device 452. The power system 422 includes power distribution circuitry for providing power to the electronic device 452 and also contains battery charging circuitry to manage recharging the battery 424 (or circuitry to replenish power to another power storage element). The power system 422 receives electrical power from external power supply 454. The power system 422 is able to be connected to the external power supply 454 through a dedicated external power connector (not shown) or through power connections within the data port 428. The power system 422 includes a battery monitoring circuit that is operable to provide a status of one or more battery status indicators, such as remaining capacity, temperature, voltage, electrical current consumption, and the like, to various components of the electronic device 452.

The data port 428 is able to support data communications between the electronic device 452 and other devices through various modes of data communications, such as high speed data transfers over an optical communications circuits. Data port 428 is able to support communications with, for example, an external computer or other device. In some examples, the data port 428 is able to include electrical power connections to provide externally provided electrical power to the electronic device 452, deliver electrical power from the electronic device 452 to other externally connected devices, or both. Data port 428 of, for example, an electronic accessory is able to provide power to an electronic circuit, such as microprocessor 402, and support exchanging data between the microprocessor 402 and a remote electronic device that is connected through the data port 428.

Data communication through data port 428 enables a user to set preferences through the external device or through a software application and extends the capabilities of the device by enabling information or software exchange through direct connections between the electronic device 452 and external data sources rather than via a wireless data communication network. In addition to data communication, the data port 428 provides power to the power system 422 to charge the battery 424 or to supply power to the electronic circuits, such as microprocessor 402, of the electronic device 452.

Operating system software used by the microprocessor 402 is stored in data storage 406. Examples of data storage 406 are able to include, for example, flash memory, magnetic based storage devices, other volatile or non-volatile data store elements, or the like. The data storage 406 is an example is able to include the above described program memory 210 and data memory 250. Some examples are able to use data storage 406 that includes a battery backed-up RAM or other non-volatile storage data elements to store operating systems, other executable programs, or both. The operating system software, device application software, or parts thereof, are able to be temporarily loaded into volatile data storage such as RAM 404. Data received via wireless communication signals or through wired communications are also able to be stored to RAM 404. The microprocessor 402 in some examples includes a component, such as is able to be defined in data storage 406 in one example, that include the processes described above that are stored in the program memory 210.

The microprocessor 402, in addition to its operating system functions, is able to execute software applications on the electronic device 452. A set of applications that control basic device operations, including at least data and voice communication applications, is able to be installed on the electronic device 452 during manufacture. In an example, programs and other data used to support the processes described above are able to be installed in the memory of the electronic device 452. Further examples of applications that are able to be loaded onto the device may be a personal information manager (PIM) application having the ability to organize and manage data items relating to the device user, such as, but not limited to, e-mail, calendar events, voice mails, appointments, and task items. The applications are able to include the above described base applications, which may be installed during manufacture or from another trusted and verified source, along with user applications that may be installed at any time.

Further applications may also be loaded onto the electronic device 452 through, for example, the wireless network 450, an auxiliary I/O device 438, Data port 428, short-range communications system 420, or any combination of these interfaces. Such applications are then able to be installed by a user in the RAM 404 or a non-volatile store for execution by the microprocessor 402.

In a data communication mode, a received signal such as a text message or web page download is processed by the communication system, including wireless receiver 412 and wireless transmitter 410, and communicated data is provided the microprocessor 402, which is able to further process the received data. In some examples, the electronic device 452 includes a display, output ports, or combinations of these. In such examples, the received data is able to be processed for output to the display 434, or alternatively, to an auxiliary I/O device 438 or the Data port 428. In examples of the electronic device 452 that include a keyboard 436 or other similar input facilities, a user of the electronic device 452 may also compose data items, such as e-mail messages, using the keyboard 436, which is able to include a complete alphanumeric keyboard or a telephone-type keypad, in conjunction with the display 434 and possibly an auxiliary I/O device 438. Such composed items are then able to be transmitted over a communication network through the communication system.

For voice communications, overall operation of the electronic device 452 is substantially similar, except that received signals are generally provided to an earpiece 432 and signals for transmission are generally produced by a microphone 430. Alternative voice or audio I/O systems, such as a voice message recording system, may also be implemented on the electronic device 452. Although voice or audio signal output is generally accomplished primarily through the earpiece 432, in examples of electronic devices 452 that include a display 434, the display 434 may also be used to provide an indication of the identity of a calling party, the duration of a voice call, or other voice call related information, for example.

Depending on conditions or statuses of the electronic device 452, one or more particular functions associated with a system circuit may be disabled, or an entire system circuit may be disabled. For example, if the battery temperature is low, then voice functions may be disabled, but data communications, such as e-mail, may still be enabled over the communication system.

A short-range communications system 420 provides for data communication between the electronic device 452 and different systems or devices, which need not necessarily be similar devices. For example, the short-range communications system 420 includes an infrared device and associated circuits and components or a Radio Frequency based communication module such as one supporting Bluetooth® communications, to provide for communication with similarly-enabled systems and devices, including the data file transfer communications described above. The short-range communications system is also able to include one or more of components to support communications over wireless links such as Wi-Fi®, Near Field Communications (NFC), any other short range link, or combinations of these A media reader 460 is able to be connected to an auxiliary I/O device 438 to allow, for example, loading computer readable program code of a computer program product into the electronic device 452 for storage into flash memory 406. One example of a media reader 460 is an optical drive such as a CD/DVD drive, which may be used to store data to and read data from a computer readable medium or storage product such as computer readable storage media 462. Examples of suitable computer readable storage media include optical storage media such as a CD or DVD, magnetic media, or any other suitable data storage device. Media reader 460 is alternatively able to be connected to the electronic device through the Data port 428 or computer readable program code is alternatively able to be provided to the electronic device 452 through the wireless network 450.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method, comprising:
computing, by a processor of a device during a system startup phase that starts privileged software processes that initialize the device and that is prior to transitioning to a device operational phase wherein any software present on the device is able to execute, a respective starting fingerprint of memory of each executing process within at least one process other than a kernel process, each process in the at least one process being started after the kernel process and during the system startup phase;
determining, by the processor during the device operational phase and while a selected executing process is executing, a present fingerprint of memory of the selected executing process where the selected executing process is within the at least one process;
determining a difference between the respective starting fingerprint of the selected executing process and the present fingerprint of the selected executing process; and
reporting, based on determining the difference, an indication of the difference for the selected executing process.

2. The method of claim 1, wherein the respective starting fingerprint for the selected executing process and the present fingerprint of the selected executing process each comprise a respective fingerprint value calculated for values stored in program memory storing program code executed by a processor to execute the selected executing process when the respective starting fingerprint and the present fingerprint are determined.

3. The method of claim 1, wherein the respective starting fingerprint for the selected executing process and the present fingerprint of the selected executing process each comprise a respective fingerprint value calculated for values stored in data memory used by the selected executing process when the respective starting fingerprint and the present fingerprint are determined.

4. The method of claim 1, wherein the respective starting fingerprint for the selected executing process and the present fingerprint of the selected executing process each comprise a respective hash value calculated for values stored in memory associated with the selected executing process when the respective starting fingerprint and the present fingerprint are determined.

5. The method of claim 1, wherein the respective starting fingerprint for the selected executing process and the present fingerprint of the selected executing process each comprise a respective fingerprint value calculated for values stored in program memory storing a subset of program code executed by a processor to execute the selected executing process when the respective starting fingerprint and the present fingerprint are determined.

6. The method of claim 1, wherein each of the at least one process executes with elevated privileges.

7. The method of claim 1, further comprising:
starting, during the system startup phase, each of the at least one process, and
wherein the determining the respective starting fingerprint of each executing process is performed after starting all of the at least one process.

8. The method of claim 1, further comprising iteratively repeating, during the device operational phase:
determining, during the device operational phase, a new present fingerprint of memory of the selected executing process within the at least one process;
determining, based on determining the new present fingerprint, a present difference between the respective starting fingerprint of the selected executing process and the new present fingerprint of the selected executing process; and
reporting, based on determining the present difference, an indication of the present difference for the selected executing process.

9. The method of claim 1, wherein some of the at least one process comprises at least one privileged process, each privileged process executing with elevated privileges, the method further comprising:
recording, based on starting a privileged process within the at least one privileged process during the system startup phase, the privileged process into a privileged process list;
detecting, during the device operational phase, a new privileged process, the new privileged process assuming elevated privileges during the device operational phase;
recording, within the privileged process list based on detecting the new privileged process, the new privileged process; and
reporting, based on detecting the new privileged process, the starting of the new privileged process.

10. The method of claim 9, wherein detecting the new privileged process comprises receiving a request from the new privileged process to assume elevated privileges.

11. The method of claim 9, further comprising:
creating, based on detecting the new privileged process, a log indicating the new privileged process;
digitally signing the log to create a signed log; and
storing the signed log into a protected storage location.

12. A device, comprising:
a processor;
a memory coupled to the processor;
a fingerprint processor, coupled to the processor and memory, the fingerprint processor, when operating, being configured to:
compute, during a system startup phase that starts privileged software processes that initialize the device and that is prior to transitioning to a device operational phase wherein any software present on the device is able to execute, a respective starting fingerprint of memory of each executing process within at least one process other than a kernel process, each process in the at least one process being started after the kernel process and during the system startup phase;
determine, during the device operational phase and while a selected executing process is executing, a present fingerprint of memory of the selected executing process where the selected executing process is within the at least one process; and determine a difference between the respective starting fingerprint of the selected executing process and the present fingerprint of the selected executing process; and a reporting processor that when operating, is configured to report, based on a determination of the difference, an indication of the difference for the selected executing process.

13. The device of claim 12, wherein the respective starting fingerprint for the selected executing process and the present fingerprint of the selected executing process each comprise a respective fingerprint value calculated for values stored in program memory storing program code executed by a processor to execute the selected executing process when the respective starting fingerprint and the present fingerprint are determined.

14. The device of claim 12, wherein the respective starting fingerprint for the selected executing process and the present fingerprint of the selected executing process each comprise a respective hash value calculated for values stored in memory associated with the selected executing process when the respective starting fingerprint and the present fingerprint are determined.

15. The device of claim 12, wherein each of the at least one process executes with elevated privileges.

16. The device of claim 12, wherein the fingerprint process, when operating, is further configured to iteratively repeat, during the device operational phase:

determining, during the device operational phase, a new present fingerprint of memory of the selected executing process within the at least one process;

determining, based on determining the new present fingerprint, a present difference between the respective starting fingerprint of the selected executing process and the new present fingerprint of the selected executing process; and reporting, based on determining the difference, an indication of the present difference for the selected executing process.

17. A non-transitory computer readable storage medium having computer readable program code embodied therewith, the computer readable program code comprising instructions executable by a processor to:

compute, by a processor during a system startup phase that starts privileged software processes that initialize the device and that is prior to transitioning to a device operational phase wherein any software present on the device is able to execute, a respective starting fingerprint of memory of each executing process within at least one process other than a kernel process, each process in the at least one process being started after the kernel process and during the system startup phase;

determine, by the processor during the device operational phase and while a selected executing process is executing, a present fingerprint of memory of the selected executing process where the selected executing process is within the at least one process;

determine a difference between the respective starting fingerprint of the selected executing process and the present fingerprint of the selected executing process; and report, based on determining the difference, an indication of the difference for the selected executing process.

18. The non-transitory computer readable storage medium of claim 17, wherein the respective starting fingerprint for the selected executing process and the present fingerprint of the selected executing process each comprise a respective fingerprint value calculated for values stored in program memory storing program code executed by a processor to execute the selected executing process when the respective starting fingerprint and the present fingerprint are determined.

19. The non-transitory computer readable storage medium of claim 17, wherein the respective starting fingerprint for the selected executing process and the present fingerprint of the selected executing process each comprise a respective hash value calculated for values stored in memory associated with the selected executing process when the respective starting fingerprint and the present fingerprint are determined.

20. The non-transitory computer readable storage medium of claim 17, wherein the computer readable program code further comprising instructions executable by a processor to:

determine, during the device operational phase, a new present fingerprint of memory of the selected executing process within the at least one process;

determine, based on determining the new present fingerprint, a present difference between the respective starting fingerprint of the selected executing process and the new present fingerprint of the selected executing process; and report, based on determining the present difference, an indication of the present difference for the selected executing process.

* * * * *